Figure 1:
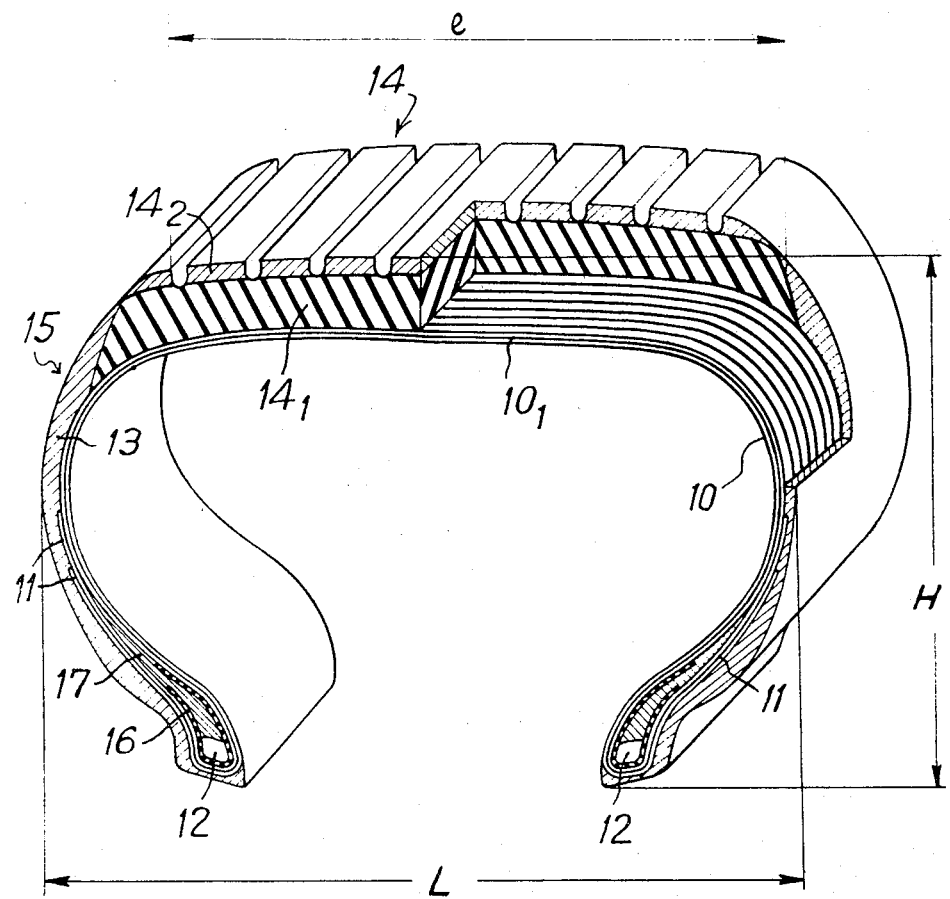

United States Patent [19]
Masson

[11] 3,773,096
[45] Nov. 20, 1973

[54] BELTED VEHICLE TIRES
[76] Inventor: Yves Masson, Paris, France
[22] Filed: Feb. 25, 1972
[21] Appl. No.: 229,403

[30] Foreign Application Priority Data
Mar. 1, 1971 France .............................. 7107047

[52] U.S. Cl. ............................ 152/361 R, 152/374
[51] Int. Cl. .............................................. B61c 9/18
[58] Field of Search ................ 152/354, 355, 361 R, 152/374

[56] References Cited
UNITED STATES PATENTS

| | | | |
|---|---|---|---|
| 3,067,795 | 12/1962 | Neuville et al. ...................... | 152/354 |
| 1,719,628 | 7/1929 | Sloman ............................. | 152/374 X |
| 3,638,705 | 2/1972 | Devienne et al. ................. | 152/362 X |
| 3,232,331 | 2/1966 | Cappa et al. ..................... | 152/374 X |
| 3,697,364 | 10/1972 | Boustany et al. ................. | 152/361 X |

*Primary Examiner*—Gerald M. Forlenza
*Assistant Examiner*—George H. Libman
*Attorney*—Joseph F. Brisebois et al.

[57] ABSTRACT

This invention relates to belted pneumatic tires, of the kind that have a low cross-section of ratio equal to or less than 0.8. According to the invention, at least the inner part of the tire tread between the carcass crown and the level of the hollows of the tread pattern is made entirely from a rubbery mixture having a high modulus of elasticity. This modulus may be greater than 60 kg/cm² at 100 percent elongation and said inner part has a thickness which is inherently sufficient to provide effective hooping and banding of the tire crown without recourse to a conventional breaker belt.

11 Claims, 3 Drawing Figures

BELTED VEHICLE TIRES

The present invention relates to vehicle tires which shall appear, so far as their behaviour and quality is concerned, to be similar to tires of known type in which the carcass crown is provided with an inextensible breaker belt interposed between the crown of the carcass and the actual tire tread. This belt usually consists of a flat annular band formed of several superimposed layers each constituted by textile or metal cables oriented along longitudinal, or practically longitudinal, directions. This belt has a width about equal to the width of the tread surface and its function is to prevent the carcass from taking up an accentuated bulged shape which otherwise would be the normal shape at rest of the carcass when the tire is inflated. Due to the fact that the stiffness conferred to the crown of the tire by this breaker belt, the carcass of these known tires is advantageously of the radial-ply type for giving to the flanks greater vertical flexibility and a better balloon shape. Moreover, tires are already known having a belt and cross-ply carcass having intermediate rolling properties.

Compared with tires of the conventional type having a non-belted cross-ply carcass, tires having a belt present a characteristic shape on their tread surface which is flatter and having a lower shape section in which the ratio of the height H to the width L of the inner tube is very often less than 0.9. They have important advantages, particularly a better resistance to wear, less resistance to creep, good road holding and better adhesion. On the other hand, such tires are very costly since their manufacture includes the assembly of a large number of separate elements and it is necessary to provide special machines which are very costly so far as economic investments are concerned.

The invention has for an object a tire which shall be simpler and less costly to manufacture but, on the other hand, possessing a large number of the essential qualities of modern tires.

To this end, the invention relates to a tire having a low section whose ratio is equal to or less than 0.8, characterised in that at least the internal part of the tire tread between the crown of the carcass and the level of the hollows of the tread pattern consists entirely of a rubbery mixture having a modulus of elasticity which is extremely high, higher than 60 kg/cm² at 100 percent elongation and this part has a thickness which is sufficient for ensuring on its own account without a breaker belt, the effective belting or banding of the carcass crown.

In the conception and make up of such a tire, it could seriously be feared that the lack of a conventional breaker belt would considerably alter the running characteristics of the tire inherent in the banding of the carcass by the said belt.

Actually, breaker belts utilised up to the present time are generally made from textile or metal cables which are materials having a considerably higher modulus of elasticity than that of the rubbery mixtures usually used for making the treads. It has never previously been proposed to dispense with the breaker belt or, if it has been so envisaged, no practical manufacturing methods have been known since the usual mixtures for tire treads have a modulus of elasticity which is considerably less (from 20 to 30 kg/cm² at 100 percent elongation) to be able to resist this circumferential elongation of the tire tread under the effect of the inflating pressure and the stresses applied in use, that is to say for ensuring a hooping or belting effect which is effective at the carcass crown.

The belt may be dispensed with in accordance with the invention due to the use of a mixutre for the tire tread of very high modulus of elasticity and giving to this tread a sufficient section so that, taken as a whole, this tread of high modulus mixture prevents the carcass of the tire when inflated from dilating towards its normal bulged shape at rest.

A sufficient section for the tire tread is obtained in general by an admissible increase in the thickness of the inner part of the tread. Preferably, the mean width of the tread made from a mixture of high modulus of elasticity is not less than 70 percent of the width L of the cross-section of the tire.

Numerous advantages accrue from this omission of the belt, the primary advantage being a great simplification in manufacture, permitting in particular the making of the whole of the tire blank on conventional machines employing a cylindrical drum in accordance with the method referred to in the trade as "in the flat". Moreover, special machines for cutting the fabrics for belts and for the manufacture of these belts themselves are no longer necessary. The tire itself, due to the fact that its crown is ringed or banded by the tire tread, has, in use, a behaviour similar to that of a tire having such a belt, particularly from the point of view of wear, road-holding and adherence to the ground. Moreover, it is no longer exposed to the specific deficiencies of belted tire such as separation or lifting which may often occur at the edges of the belt. Finally, it can easily be re-treaded due to the absence of a breaker belt.

The invention is more particularly applied to radial-ply tires, but it is also applicable to cross-ply tires. In the latter case, the invention offers the additional advantage of further permitting manufacture "in the flat" even when the cables of the carcass form angles greater than 45° in contradistinction to known cross-ply tires having breaker belts where the belt can only be laid "in the flat" before curving the tire if the cross-ply carcass has a small angle not greater than that of the belt.

In accordance with another feature of the invention, the walls of the tire have a more supple flexing zone located in the upper half of the walls in the vicinity of the shoulders of the tyre. This localised zone of relative suppleness may be formed in several ways, for example by giving to the walls a profile and thickness which decrease from the beads in such a fashion as to have a minimum thickness in the upper part of the walls or again by advantageously reinforcing the upper part of the walls.

According to another feature of the invention, the side bands used for protecting the walls of the tire carcass are made with the same rubbery mixture of high modulus of elasticity as that of the tire tread. This permits the additional simplification of manufacture by utilising the same mixture batches for preparing the tire tread and side bands. The assembly of the tire tread and side strips can be produced, moreover, in a single piece by pressing, particularly when the tire is manufactured by the conventional "in the flat" method.

Figure 2:
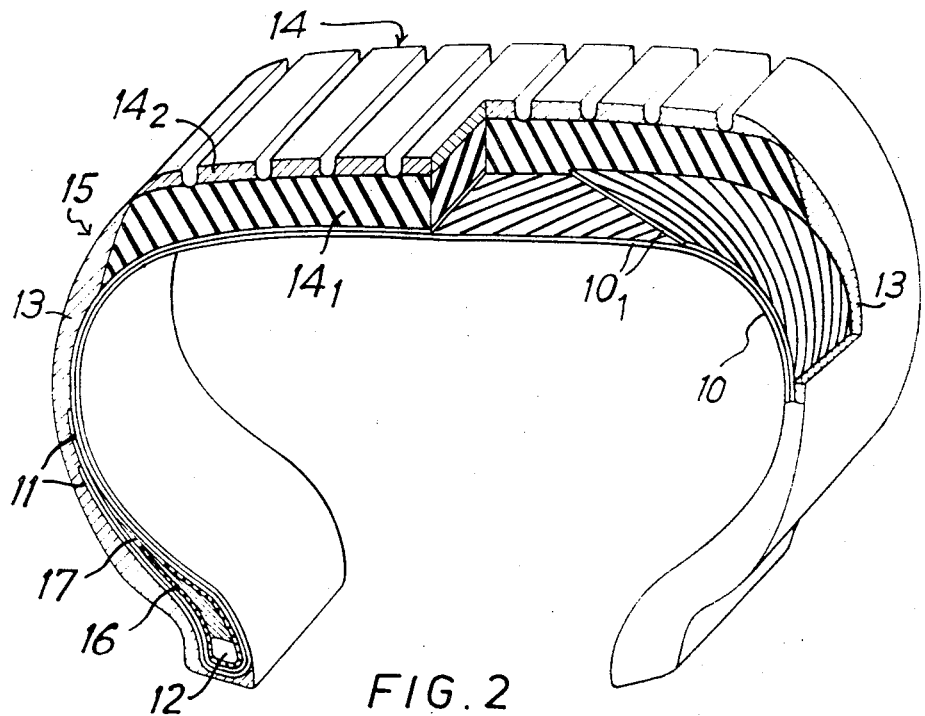
Figure 3:
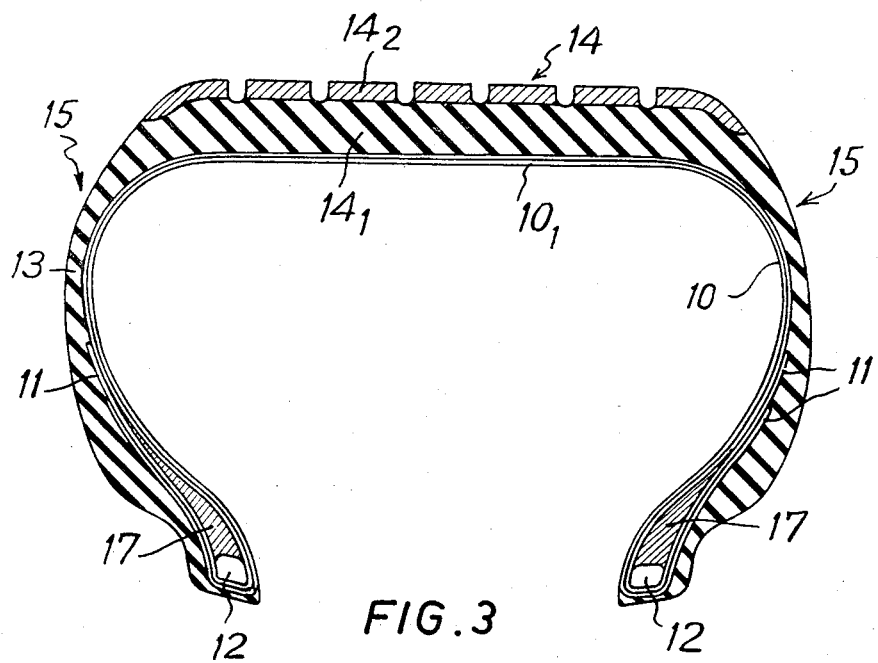

In order that the invention may be more clearly understood, reference will now be made to the accompanying drawings which show certain embodiments thereof by way of example, and in which:

FIGS. 1 and 2 show perspective views of tire portions respectively having radial and cross-ply carcasses, and FIG. 3 is a section through another embodiment.

Referring now to the drawings, the tire shown in FIG. 1 comprises a carcass 10 formed by one or more layers of "cord" fabric without weft or with only a slight weft, made from rayon, nylon, polyester, glass fibre or metal cables, these cables being oriented along meridian planes of the tire. The edges 11 of the carcass layers are turned over beads formed by small strips 12. This carcass is covered externally on the sides by wall bands 13, and on the crown by a tread 14.

The shape shown in the drawing is the shape of the cross-section of the tire in the non-inflated state, that is to say, the moulding shape. It is similar to the characteristic shape of breaker-belted tire having a low section where the ratio of the height H to the width L is equal to or less than 0.8, having a substantially flat tread surface or one which is only slightly bulged in the transverse direction.

The tire shown in FIG. 2 is similar to that of FIG. 1, but comprises a cross-ply carcass 10 formed by at least two layers of cables oriented in symmetrical directions forming an angle which may be greater than 45° and for example between 45° and 90° with respect to the equatorial plane of the tire.

According to the invention, the inner part $14_1$ of the tire tread 14, that is to say the part between the crown $10_1$ of the carcass 10 and the level of the hollows in the patterned part $14_2$, is made from a rubbery mixture having a very high modulus of elasticity, i.e. greater than 60 kg/cm$^2$ at 100 percent elongation. This inner part $14_1$ has an average width $l$ approximately equal to the width of the ground contact surface of the tire under normal load and pressure conditions, this width $l$ being at least equal to or greater than 70 percent of the width L of the cross-section of the tyre. This inner part $14_1$ thus has a substantially uniform thickness from one edge to the other of the tread surface and this thickness is greater than that provided usually in known tires, so as to ensure effective hooping of the inflated tyre. The patterned outer part $14_2$ is itself made from a rubbery mixture of known type that is to say having a low modulus of elasticity of the order of 20 to 30 kg/cm$^2$ at 100 percent elongation and having a good resistance to wear and good adherence under running conditions on varied ground, dry or wet. The pattern of this outer part $14_2$ of the tread depends on the envisaged use of the tire, but it has preferably a circumferential tendency, that is to say, a pattern having a predominance of continuous circumferential grooves and a minimum of transverse cuts. The grooves of this patterned part may thus participate to a small extent in the resistance of the band to longitudinal stretch.

The side bands 13 are made of a rubbery mixture of usual kind, that is to say having a low modulus of elasticity of the order of 15 to 20 kg/cm$^2$ at 100 percent elongation. Nevertheless, the walls have the particular feature of having a more supple bending zone 15 located close to the shoulders of the tire. This more supple zone is obtained in the present case, on the one hand, by giving the walls 13 a thickness that decreases in the upward direction from the beads so that the walls have a minimum thickness in the zones 15 and, on the other hand, by relatively reinforcing the lower half of the walls to render them more resistant to bending. This reinforcement may be effected in any suitable way for example, as in the case shown, by causing the folded edges 11 of the carcass layers to extend to a point adjacent the middle of the walls. Relatively stiff flippers 16 and/or filling rubbers 17 made from a hard rubbery mixture which extends relatively high up the walls may also be used.

The determination of the thickness to be given to the inner part $14_1$ of the tread does not offer any particular difficulty. The resistance which this part of the tread must have to oppose the circumferential extension of the tire under the effect of the normal inflated pressure can be calculated approximately, and from this resistance can be determined the surface of the cross-section of the tread, then the desired thickness as a function of the mean width $l$ and of the modulus of elasticity of the mixture used. As indicated above, this modulus of elasticity must be very high so that the thickness remains within reasonable limits. When it is measured at 100 percent elongation as in current practice, this modulus must be greater than 60 kg/cm$^2$ and preferably greater than 100 kg/cm$^2$. It may obviously reach even greater values and rise, for example, to approximately 350 kg/cm$^2$. If this modulus is measured at a smaller elongation, for example at 10 percent elongation, it must in this case be greater than 10 kg/cm$^2$ and preferably be at least close to 14 kg/cm$^2$. The use for the treads of rubbery mixture having quite high moduli of elasticity is believed to be entirely new since the establishment and formulation of these mixtures leads to difficulties in practice which had not been resolved industrially until recently. On the other hand, experience shows, in a quite unexpected manner, that for some applications it is not necessary for the resistance to circumferential extension of the tread to be as high as the theoretical resistance obtained by taking as a basis for calculation the presence of a breaker belt of textile or metal cables. It may be sufficient for the tread of a mixture having a high modulus of elasticity to resist a limited and relatively small extension of the periphery of the tire under the action of the normal inflation pressure.

In another embodiment shown in FIG. 3, the side bands 13 covering the walls of the carcass are made with the same mixture having a high modulus of elasticity as that of the inner part $14_1$ of the tread. This is advantageous for manufacture, since the part $14_1$ of the tread and the walls 13 can be obtained directly by a single pressing or extrusion operation. On the other hand, in the finished tire, the walls 13 made from a high modulus mixture tend to increase the resistance to side stresses exerted on the tire for example, when turning, and in consequently increasing the lateral stability of the tire and in decreasing its response time to the change of direction movements controlled by the driver. If, however, it is desired to decrease this stiffness of the walls, particularly with a view to increasing their vertical suppleness to improve the comfort, the thickness thereof may be reduced. This thinning of the walls is preferably localised in the upper part of the walls above the horizontal median plane of the cross-section of the tire, in a manner to form a supple bending zone 15 close to the shoulders of the tire.

The use of a high modulus mixture for the walls 13 further offers the advantage of relatively reinforcing the low part of the walls adjacent the beads which favours good seating of the tyre on its rim. This effect may be completed by having quite wide carcass edges 11 extending to a point adjacent the middle of the walls. By using separately or together one or other of these features, in some cases the usual reinforcements of the beads can be omitted, such as the "flippers" surrounding the strips 11 and the outer small stiffening strips. Thus, an extremely simplified and very economical structure of the tire is obtained.

Mixtures having very high moduli of elasticity suitable for producing the inner part $14_1$ of the tread and possibly the side strips 13, may be obtained by incorporating reinforcing fillers in high proportions and short textile or metal fibres. It is advantageous to use very fine fibres having a diameter not greater than 0.03 mm. These very fine fibres enable rubbery mixtures to be obtained which are easier to work in the crude state, which are much more homogeneous and in which the fibres form a very thin reinforcing network. Very fine glass fibres are extremely suitable for producing these mixtures.

If desired, rubbery mixtures may be used that have a reinforcing filler consisting at least partly of a fine powder of a polyolefine, such as polyethylene or polypropylene having a very high molecular weight, that is to say, a mean molecular weight greater than approximately 500.000. Preferably, these mixtures also include carbon black. Contrary to the mixtures filled with short fibres, the latter mixtures are homogeneous to the macroscopic scale and they have the advantage of being easier to use on the usual tools and machines used in the rubber industry. They may more particularly be extruded easily in the form of treads. After hot vulcanisation of the tires, they have a very high modulus of elasticity.

The Table below indicates examples of mixtures which have been found to be suitable:

TABLE 1

| | A | B | C | D | E |
|---|---|---|---|---|---|
| Natural or synthetic rubber | 100 | 100 | 100 | 100 | 100 |
| Carbon Black Type HAF | 55 | 45 | 70 | 40 | 80 |
| Cut glass fibres | 15 | | | | |
| Polyethylene | | 100 | 100 | | |
| Isostatic Polypropylene | | | | 40 | 40 |
| Zinc Oxide | 5 | 5 | 5 | 10 | 10 |
| Stearic Acid | 3 | 3 | 3 | 3 | 3 |
| Aromatic oil | 5 | 5 | 5 | 3 | 3 |
| Anti-oxidising agents, such as phenyl-$\beta$ naphtylamine | 2 | 2 | 2 | 3 | 3 |
| Accelerator | 1 | 1 | 2,5 | 0,75 | 0,75 |
| Sulphur | 3 | 1,5 | 4 | 2 | 2 |

After vulcanisation, these rubbery mixtures have the following properties, respectively:

TABLE 2

| | AB | CD | E |
|---|---|---|---|
| Shore A hardness. | 85 89 | 94> 95> | 95 |
| Modulus of elasticity at 10% (kg/cm²) | 15 14 | 17 35 | 50 |
| Modulus of elasticity at 100% (kg/cm²) | 120 105 | 142 208 | 350 |
| Resistance to breaking (kg/cm²) | 140 180 | 193 225 | 350 |
| Elongation at breaking % | 150 300 | 200 112 | 100 |

I claim:

1. A belted beaded pneumatic tire having a low cross-section of ratio not greater than 0.8 and comprising: a carcass containing of at least one ply extending from bead to bead, the crown of said carcass being substantially flat in cross-section, side wall bands each covering an outer side of said carcass and extending from a bead to a shoulder area of the tire, a thick rubber tread covering said crown area of said carcass and having a mean width at least equal to 70% of the total width of the tire cross-section, said tread having an outer patterned part the external surface of which is substantially flat in cross-section, at least the inner part of said tread between said carcass crown and the level of the hollows of the tread pattern is made entirely from an homogeneous rubbery mixture having a reinforcing filler formed at least partly by a finely divided polyolefine having a molecular weight not less than 500,000 so that said inner tread part has a modulus of elasticity greater than 60 kg/cm2 at 100 percent elongation to provide an effective hooping or belting action of said crown of said tire without the provision of any breaker belt ply.

2. A tire according to claim 1, wherein said outer patterned part of said tire tread is made from a rubbery mixture having a lower modulus of elasticity and having good resistance to abrasion.

3. A tire according to claim 1, wherein side wall bands have a minimum thickness in the upper half of the wall close to the shoulders of said tire.

4. A tire according to claim 3, wherein said side walls are made from the same rubbery mixture having a high modulus of elasticity as that of said inner part of said tread.

5. A tire according to claim 1, wherein said carcass is of the radial-ply type.

6. A tire according to claim 1, wherein said carcass is of the cross-ply type the angle between the plies thereof being greater than 45°.

7. A belted beaded pneumatic tire having a low cross-section of ratio not greater than 0.8 and comprising a carcass consisting of at least one ply extending from bead to bead, the crown area of said carcass being substantially flat in cross-section, a thick rubber tread covering said crown area of said carcass, said tread having an outer patterned part, the external surface of which is substantially flat in cross-section, side wall bands covering the outer sides of said carcass and extending from the beads to said tread with a minimum thickness in the upper half of the side walls of the tire, close to the shoulders of said tire, the inner part of said tread between the carcass crown and the level of the hollows of the tread pattern, as well as the side wall bands being made entirely from a rubbery mixture having a modulus of elasticity greater than 60 kg/cm2 at 100 percent elongation, said inner tread part having a thickness inherently sufficient to provide effective hooping or belting action of the crown of said tire without the provision of any breaker belt ply.

8. A tire according to claim 7, wherein said outer patterned part of said tire tread is made from a rubbery mixture having a lower modulus of elasticity and having good resistance to abrasion.

9. A tire according to claim 7, wherein said carcass is of the radial-ply type.

10. A tire according to claim 7, wherein said carcass is of the cross-ply type, the angle between the plies thereof being greater than 45°.

11. A tire according to claim 7, wherein said inner part of said tread is made from a rubbery mixture containing a large amount of reinforcing filler and short fibres dispersed throughout said mixture, said fibres having a diameter less than 0.03 mm.

* * * * *

UNITED STATES PATENT OFFICE
CERTIFICATE OF CORRECTION

Patent No. 3,773,096                Dated  20 November 1973

Inventor(s)   YVES MASSON

It is certified that error appears in the above-identified patent and that said Letters Patent are hereby corrected as shown below:

[73] Assignee:  Pneumatiques, Caoutchouc Manufacture et

Plastiques Kleber-Colombes, Colombes,

France

Signed and sealed this 23rd day of July 1974.

(SEAL)
Attest:

McCOY M. GIBSON, JR.           C. MARSHALL DANN
Attesting Officer              Commissioner of Patents